US010118844B2

(12) United States Patent
Gupta et al.

(10) Patent No.: US 10,118,844 B2
(45) Date of Patent: Nov. 6, 2018

(54) MULTIFUNCTIONAL METHOD FOR MEMBRANE PROTECTION AND BIOFOULING CONTROL

(71) Applicant: ECOLAB USA INC., St. Paul, MN (US)

(72) Inventors: Amit Gupta, Aurora, IL (US); Harshada Lohokare, Maharashtra (IN)

(73) Assignee: ECOLAB USA INC., St. Paul, MN (US)

( * ) Notice: Subject to any disclaimer, the term of this patent is extended or adjusted under 35 U.S.C. 154(b) by 448 days.

(21) Appl. No.: 14/586,989

(22) Filed: Dec. 31, 2014

(65) Prior Publication Data
US 2016/0185630 A1  Jun. 30, 2016

(51) Int. Cl.
B01D 65/08 (2006.01)
C02F 1/72 (2006.01)
C02F 1/70 (2006.01)
C02F 1/469 (2006.01)
C02F 1/44 (2006.01)
(Continued)

(52) U.S. Cl.
CPC ............ C02F 1/722 (2013.01); B01D 65/08 (2013.01); B01D 2321/02 (2013.01); B01D 2321/162 (2013.01); B01D 2321/168 (2013.01); C02F 1/44 (2013.01); C02F 1/4693 (2013.01); C02F 1/4695 (2013.01); C02F 1/70 (2013.01); C02F 1/76 (2013.01); C02F 2103/08 (2013.01);
(Continued)

(58) Field of Classification Search
CPC ........ B01D 65/02; B01D 65/06; B01D 65/08; B01D 2321/02; B01D 2321/10; B01D 2321/16; B01D 2321/162; B01D 2321/164; B01D 2321/168; C02F 1/722; C02F 2303/185; C02F 1/70; C02F 1/4695; C02F 1/44; C02F 1/4693; C02F 1/76; C02F 2303/20; C02F 2303/04; C02F 2103/08
See application file for complete search history.

(56) References Cited

U.S. PATENT DOCUMENTS

2002/0027111 A1    3/2002  Ando et al.
2002/0153329 A1*  10/2002  Hempel ................ B01D 29/27
                                                210/749
(Continued)

FOREIGN PATENT DOCUMENTS

CN    102821610 A    12/2012
CN    103061206 A    4/2013
WO  WO 2013/059019 A1  4/2013

OTHER PUBLICATIONS

International Search Report and Written Opinion for International Application No. PCT/US2014/061497, dated Jan. 29, 2015 (12 pages).

(Continued)

Primary Examiner — David C Mellon
(74) Attorney, Agent, or Firm — Eric D. Babych; Brinks Gilson & Lione

(57) ABSTRACT

The invention provides methods and compositions for the protection of a membrane from both biofouling and from damage caused by a biocide. The invention utilizes PAA as both a biocide and as a reducing agent for other oxidizing biocides. This is especially beneficial because without the invention one would be forced to choose between preventing membrane biofouling or preventing membrane damage from oxidizing biocides.

7 Claims, 4 Drawing Sheets

(51) Int. Cl.
*C02F 1/76* (2006.01)
*C02F 103/08* (2006.01)

(52) U.S. Cl.
CPC .... *C02F 2303/04* (2013.01); *C02F 2303/185* (2013.01); *C02F 2303/20* (2013.01)

(56) References Cited

U.S. PATENT DOCUMENTS

| | | | |
|---|---|---|---|
| 2002/0189647 A1* | 12/2002 | Labib | A47L 13/50 |
| | | | 134/21 |
| 2003/0029812 A1 | 2/2003 | Burns et al. | |
| 2003/0064089 A1 | 4/2003 | Kumar | |
| 2003/0203827 A1* | 10/2003 | Cooper | A61L 2/16 |
| | | | 510/247 |
| 2005/0147528 A1 | 7/2005 | Shim et al. | |
| 2006/0032823 A1* | 2/2006 | Harrison | A61L 2/18 |
| | | | 210/754 |
| 2006/0089285 A1 | 4/2006 | Ahmed et al. | |
| 2007/0056904 A1 | 3/2007 | Hogt et al. | |
| 2007/0210002 A1 | 9/2007 | Mullette et al. | |
| 2008/0169006 A1 | 7/2008 | Musale et al. | |
| 2009/0043123 A1* | 2/2009 | Copenhafer | C07C 407/00 |
| | | | 562/6 |
| 2010/0092574 A1 | 4/2010 | Sweeny | |
| 2013/0026097 A1 | 1/2013 | Hirao et al. | |
| 2013/0101683 A1 | 4/2013 | Tu et al. | |

OTHER PUBLICATIONS

PCT International Search Report and Written Opinion for corresponding application PCT/US2015/054622, dated Jan. 20, 2016 (10 pages).

* cited by examiner

MULTIFUNCTIONAL METHOD FOR MEMBRANE PROTECTION AND BIOFOULING CONTROL

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to compositions, methods, and apparatuses for improving the performance of membranes used in water treatment applications. Historically, membrane separation processes or systems were not considered cost effective for water treatment due to the adverse impacts that membrane scaling, membrane fouling, membrane degradation and the like had on the efficiency of removing solutes from aqueous water streams. With advances in technology, use of membranes as part of separation systems is on the increase, though issues discussed above continue to persist. Organisms present in water sources often result in biofouling which impairs membrane performance and/or damages the membranes themselves. Unfortunately treating biofilms or their causes with biocides (and in particular oxidizing biocides) often addressed the biofilm at the cost of damage to the membranes themselves.

Thus there is clear utility in a novel way of addressing membrane biofilms that does not simultaneously damage the membranes themselves, and/or in a process that allows for improved run-ability of the membrane system. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

To satisfy the long-felt but unsolved needs identified above, at least one embodiment of the invention is directed towards a method of preserving the effectiveness of a membrane in a water process flow. The method comprises the steps of: adding a strong oxidizing biocide to process water, further downstream but upstream from the membrane adding a PAA bearing composition to the water, the PAA bearing composition being an oxidant but effectively reducing the oxidizing biocide so that the harm it causes the membrane is reduced by at least 50%. The method excluding the addition of a reducing agent in an amount capable of substantially neutralizing the oxidizing biocide so that the harm it causes the membrane is reduced by at least 50%. The PAA bearing composition may be eq-PAA. The PAA bearing composition may comprise 1-50% peroxide.

At least one embodiment of the invention is directed towards a method of preserving the effectiveness of a membrane in a water process flow. The method comprises the steps of: adding PAA to the water process flow upstream from the membrane in an amount sufficient to inhibit the growth of a biofilm on the filter. The PAA may be eq-PAA which comprises 1-50% peroxide. The method may further comprise the step of adding a strong oxidant and a reducing agent neutralizer to the water upstream from the addition of the PAA. The addition of a reducing agent neutralizer may have resulted in turning the water anoxic but for the addition of the PAA. The water may contain sufficient ionic or metallic particles that but for the presence of the PAA the water would turn anoxic. The method may further comprise the step of removing precipitated ions from the water.

The method water may contain peroxide and the method may further comprise contacting the peroxide with halogenated oxidant prior to its contact with the membrane, the contact resulting in the conversion of at least some of the peroxide into molecular oxygen and water. The oxygen may be produced in an amount sufficient to reduce the population of microorganisms in the water.

The water fed into the water process flow may be one selected from the group consisting of: river water, sea water, desalinated water, brackish water, well water, aquifer water, pond water, wastewater, recirculated water, sewage water, purified water, de-oxygenated water, and any combination thereof. The membrane may be one selected from the group consisting of: pressure-driven, microfiltration, ultrafiltration, nanofiltration, reverse osmosis, forward osmosis, electrodialysis, electrodeionization, pervaporation, membrane extraction, membrane distillation, membrane stripping, membrane aeration, submerged membrane, and any combination thereof. The PAA dosage to membrane system may be in presence of one or more of: antiscalants and pretreatment chemicals. It may be added while the membrane is or is not is in operation. The PAA may be added in a clean in place effective amount of PAA to at least a portion of a membrane's surface and optionally rinsing the portion of the membrane's surface with a fluid.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Figure 1:
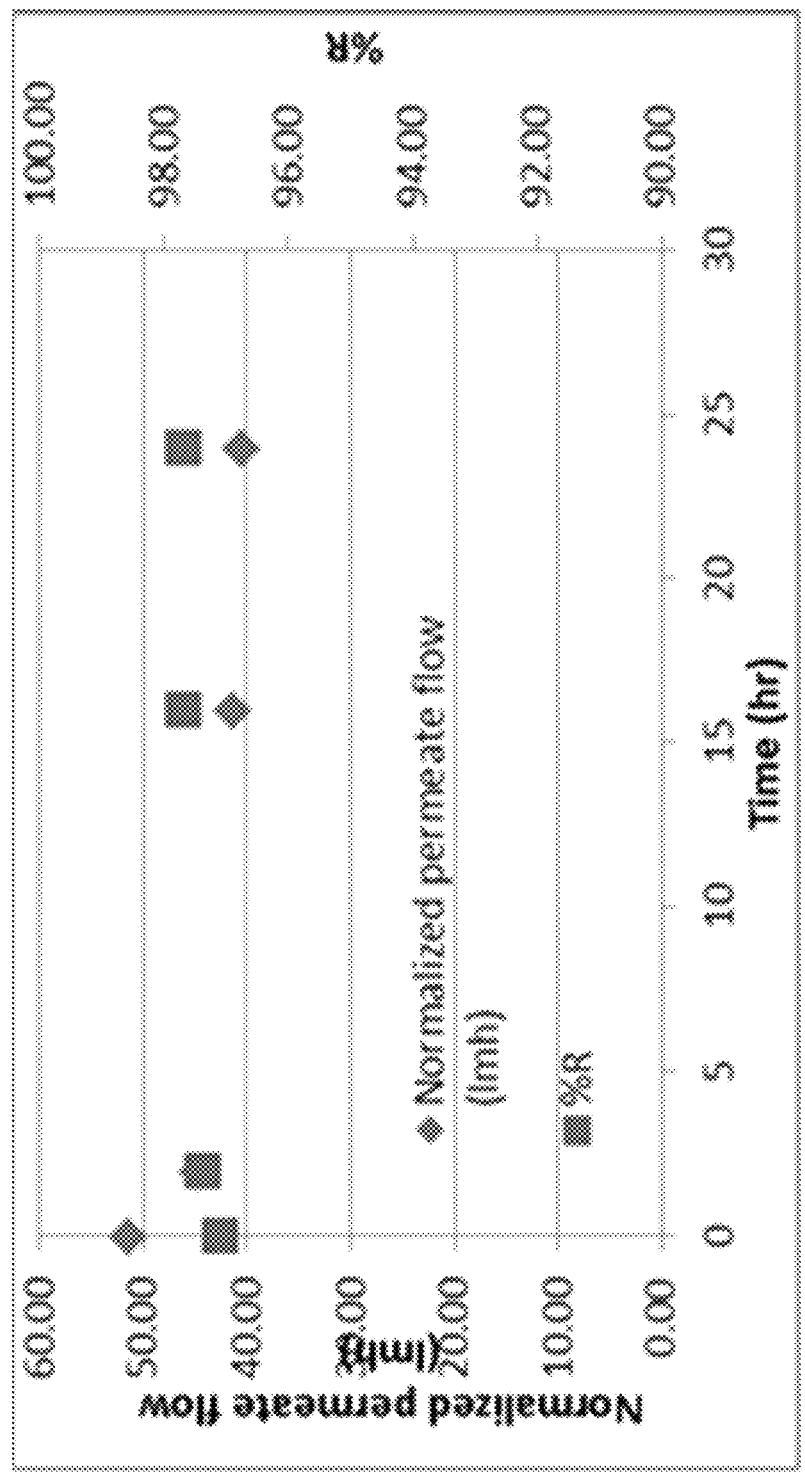
FIG. 1 is a graph whose data illustrates the effectiveness of the invention on a membrane at a dosage of 50 ppm.

The following definitions are provided to determine how terms used in this application, and in particular how the claims, are to be construed. The organization of the definitions is for convenience only and is not intended to limit any of the definitions to any particular category.

"PAA" means peracetic acid or peroxyacetic acid, a molecule for which one possible manner of representing its structure is:

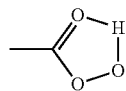

"eq-PAA" means equilibrium peracetic acid, a composition of matter whose constituents at least in part transition between PAA, peroxide, and acetic acid, the relative amounts of PAA, peroxide, and acetic acid present in a given sample of eq-PAA vary based on the specific thermodynamic conditions of the given sample, at any given moment eq-PAA may comprise 0-100% PAA, 0-100% peroxide, and 0-100% acetic acid, further details of eq-PAA and methods of its production are described in the paper: *Peracetic Acid (CAS No. 79-21-0) and its Equilibrium Solutions*, JACC No. 40, pp. 2-3(2013), and U.S. Pat. No. 7,012,154, as used herein "PAA" and "eq-PAA" also include all other per-acid biocides described in U.S. Pat. No. 7,012,154 mutatis mutandis.

"Dilution Filtration" means a process in which a material undergoing a filtration process is also being diluted by the addition of liquid to the material, dilution filtration can be simultaneous (the filtration and dilution occur at the same time) staged (the dilution and filtration processes occur one after the other), and/or both and can have one or more relative rates (liquid can be removed from the material by the filtration process faster, slower and/or at the same rate as liquid is added by the dilution process).

"Filter" means a structure constructed and arranged to remove suspended materials from within a liquid that is passed through it, more detailed descriptions of filters and filtration are described in *The Nalco Water Handbook* (3rd Edition), by Daniel Flynn, McGraw Hill (2009) in general and in particular pp. 6.1-8.30.

"Filter Cake" means the accumulation of solid matter that is retained on a filter, it increases in the course of filtration and becomes thicker as more particulate matter is retained, with increasing layer thickness the flow resistance of the filter cake increases, and if not removed soon enough, eventually thick filter cake can disrupt filtration because the flow resistance of the filter cake gets so high that too little of the mixture to be filtered can pass through the filter cake and filter plugs. Filter cake may result from biofilms and/or biofouling.

"FO" means forward osmosis, an osmotic process that, like reverse osmosis, uses a semi-permeable membrane to effect separation of water from dissolved solutes, the driving force for this separation is an osmotic pressure gradient, such that a "draw" solution of high concentration (relative to that of the feed solution), that is used to induce a net flow of water through the membrane into the draw solution, thus effectively separating the feed water from its solutes, this is in contrast to reverse osmosis process which may use hydraulic pressure as the driving force for separation, which may serve to counteract the osmotic pressure gradient that would otherwise favor water flux from the permeate to the feed.

"Membrane" means a structure having lateral dimensions much greater than its thickness though which a mass transfer may occur, membranes may be used to filter liquids.

"MF" means microfiltration, a membrane based separation process in which particles and dissolved macromolecules larger than 0.1 μm do not pass through the membrane, MF may be pressure driven.

"Microorganism(s)" means any organism small enough to insinuate itself within, adjacent to, on top of, or attached to a membrane, it includes but is not limited to those organisms so small that they cannot be seen without the aid of a microscope, collections or colonies of such small organisms that can be seen by the naked eye but which comprise a number of individual organisms that are too small to be seen by the naked eye, as well as one or more organisms that can be seen by the naked eye, it includes but is not limited to any organism whose presence, in some way impairs the operation of a membrane, it includes but is not limited to noncellular or unicellular (including colonial) organisms, it includes all prokaryotes (and certain eukaryotes) and include bacteria (including cyanobacteria), spores, lichens, fungi, protozoa, virinos, viroids, viruses, phages, and some algae. As used herein, the term "microbe" is synonymous with microorganism.

"NF" means nanofiltration, a membrane based separation process in which particles and dissolved macromolecules larger than 1 nm do not pass through the membrane, NF may be pressure driven.

"RO" means reverse osmosis a water purification technology that uses a hydrostatic force (a thermodynamic parameter) to overcome osmotic pressure (a colligative property) in the water to remove one or more unwanted items from the water, RO may be a membrane based separation process, wherein the osmotic pressure is overcome by the hydrostatic force, it may be driven by chemical potential, RO may be pressure driven, RO can remove many types of molecules and ions from solutions and is used in both industrial processes and in producing potable water, in a pressurized RO process the solute is retained on the pressurized side of the membrane and the pure solvent is allowed to pass to the other side, to be "selective," an RO membrane may be sized to not allow large molecules or ions through the pores (holes), and often only allows smaller components of the solution (such as the solvent) to pass freely, in some cases dissolved molecules larger than 0.5 nm do not pass through membrane.

"Separation" means a mass transfer process that converts a mixture of substances into two or more distinct product mixtures, at least one of which is enriched in one or more of the mixture's constituents, it includes but is not limited to such processes as: Adsorption, Centrifugation, cyclonic separation, density based separation, Chromatography, Crystallization, Decantation, Distillation, Drying, Electrophoresis, Elutriation, Evaporation, Extraction, Leaching extraction, Liquid-liquid extraction, Solid phase extraction, Flotation, Dissolved air flotation, Froth flotation, Flocculation, Filtration, Mesh filtration, membrane filtration, microfiltration, ultrafiltration, nanofiltration, forward osmosis, reverse osmosis, Fractional distillation, Fractional freezing, Magnetic separation, Precipitation, Recrystallization, Sedimentation, Gravity separation, Sieving, Stripping, Sublimation, Vapor-liquid separation, Winnowing, Zone refining, and any combination thereof.

"Submerged Membrane" means a membrane positioned entirely beneath the surface layer of a liquid and which effects mass transfer of materials suspended within the liquid it is submerged within.

"Surfactant" is a broad term which includes anionic, nonionic, cationic, and zwitterionic surfactants. Enabling descriptions of surfactants are stated in *Kirk-Othmer, Ency-*

*clopedia of Chemical Technology*, Third Edition, volume 8, pages 900-912, and in *McCutcheon's Emulsifiers and Detergents*, both of which are incorporated herein by reference.

"Thickener" or "Settler" means a vessel used to effect a solid-liquid separation of a slurry, often with the addition of flocculants, the vessel constructed and arranged to receive a slurry, retain the slurry for a period of time sufficient to allow solid portions of the slurry to settle downward (underflow) away from a more liquid portion of the slurry (overflow), decant the overflow, and remove the underflow. Thickener underflow and thickener overflow are often passed on to filters to further separate solids from liquids.

"Ultrafiltration" means a process of filtration in which hydrostatic pressure forces a filtrate liquid against a semipermeable membrane, suspended solids and solutes of high molecular weight are retained, while water and low molecular weight solutes pass through the membrane, it is used in industry and research for purifying and concentrating macromolecular ($10^3$-$10^6$ Da) solutions, it includes but is not limited to microfiltration, nanofiltration or gas separation, it may be applied in cross-flow or dead-end mode and separation in ultrafiltration may undergo concentration polarization the exact metes and bounds and protocols for applying and categorizing ultrafiltration are elucidated in the scientific reference: *Ultrafiltration and Microfiltration Handbook, Second Edition*, by Munir Cheryan, Published by CRC Press LLC, (1998).

"Water Soluble" means materials that are soluble in water to at least 3%, by weight, at 25 degrees C.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims. All illustrated chemical structures also include all possible stereoisomer alternatives.

At least one embodiment of the invention is directed towards a method of reducing the accumulation of filter cake, biological fouling, and or biofilm on a membrane system. The method comprises adding a biocide composition which comprises eq-PAA, or a differently produced peroxyacetic acid chemistry, to a water flow upstream from a membrane or a filtration system. The PAA is added in an amount sufficient to effectively reduce the population of organisms in the water so when the water flow reaches the membrane, biofilms do not as readily accumulate. Also upstream from the membrane, halogenated oxidants are commonly added to aid the process of water disinfection or pretreatment. Because a sufficient amount of the eq-PAA or other PAA composition is in the form of peroxide, as the halogenated oxidant comes into contact with the peroxide, the halogenated oxidant and peroxide are converted into water and molecular oxygen so any harm that would occur from the contact of the halogenated oxidant with the membrane is greatly reduced or is completely prevented. Thus before the biocide reaches the membrane it has both cleansed the water of much or all of the biofilm forming organisms and has also prevented contact between a damaging oxidant and the membrane.

In at least one embodiment a membrane separation, using a selective membrane, is used in an industrial separation technology for processing of liquid streams, such as water purification. In membrane separation, a small amount of constituents of the influent typically pass through the membrane as a result of a driving force(s) in the feed stream, to form the permeate stream (on the other side of the membrane), thus leaving behind elevated amounts of the original constituents in a stream known as the concentrate or reject stream.

In at least one embodiment the membrane separation methods used includes but is not limited to microfiltration (MF), ultrafiltration (UF), nanofiltration (NF), reverse osmosis (RO), forward osmosis (FO), electrodialysis, electrodeionization, pervaporation, membrane extraction, membrane distillation, membrane stripping, membrane aeration, and other processes, and any combination thereof.

In at least one embodiment the membrane is pressure driven. Pressure-driven membrane filtration uses pressure as the driving force and is commonly known as membrane filtration. Pressure-driven membrane filtration includes microfiltration, ultrafiltration, nanofiltration, forward osmosis, and reverse osmosis. In contrast to pressure driven membrane filtration an electrical driving force is used in electrodialysis and electrodeionization.

Historically, membrane separation processes or systems were not considered cost effective for water treatment due to the adverse impacts that membrane scaling, membrane fouling, membrane degradation and the like had on the efficiency of removing solutes from aqueous water streams. However the invention allows for a membrane separation that is more commercially viable for treating aqueous feed streams suitable for use in industrial and domestic processes.

The invention is especially helpful in addressing scaling and/or fouling of the membrane. During membrane separation, deposits of scale and foulants (biological, inorganic, chemical, and/or or colloidal) on the membrane can adversely impact the performance of the membrane. For example, foulants and scales can decrease the permeate flow through the membrane for a given driving force, lower the permeate quality (purity), quantity, increase energy consumed to maintain a given permeate flow, or the like. This may necessitate a cleaning process for the said membrane system and subsequently may necessitate the use of an antimicrobial agent that can provide a level of microbial control in the process fluid stream and also aid in biofouling control on the membrane surface. Thus, the performance of the membrane system in use can be maintained.

Of particular value is the ability of the invention to reduce or prevent biofouling of the membrane. Biofouling is a particularly difficult type of fouling to control, prevent, or clean, particularly in membrane-involved systems. Microorganisms are universally abundant and biofouling is ubiquitous, and consists of fouling by microbial contaminants and the substances that they produce. One such produced substance is the "extra-cellular polysaccharides" known as the EPS or slime that often contains colonies of organisms. Biofouling, whether from living or dead organisms, or the extra cellular products they produce, can clog flow channels in the membrane. Further, biofouling can attract other types of foulants such as colloidal foulants or scale. It can also contribute to fouling by scaling and other partially soluble salts. It does so by altering the flow dynamics within the membrane. When flow does not have sufficient turbulence, the natural concentration gradient or polarisation that exists within or on th surface of a membrane can create problems. More severe ("thicker") gradients can be formed. Since reverse osmosis membranes allow a percentage of the salt at the membrane barrier to pass through, the concentration gradient needs to be minimized. If it is not, the membrane surface sees a higher concentration of salts than in the bulk solution. A percentage of this higher concentration of salts passes through the membrane, resulting in a lower permeate quality (higher conductivity) than would be experienced in the absence of the "thick" concentration gradient.

In at least one embodiment the membrane biofouling control processes includes the use of a biocontrol agent (biocide/antimicrobial compound) to reduce the number of live microorganisms. The antimicrobial agents can be of different types but their use for controlling biofouling in separation systems is mainly driven by cost and compatibility to the material used in the separation system. The most common antimicrobial of choice is sodium hypochlorite (common name 'bleach'). Thus the invention allows for the use of water sources that would otherwise result in the membrane being ineffective due to EPS, biofilm, or other scale buildup.

The invention allows for the use of a raw water fluid stream to be treated through membrane separation systems that have varied sources of origin including but not limited to river water, sea water, desalinated water, brackish water, well water, aquifer water, pond water, wastewater, recirculated water, sewage water, purified water, and/or de-oxygenated water. In at least one embodiment the water may undergo a pre-treatment process before being fed into a separation and/or membrane system. A common method of pretreatment includes the use of sodium hypochlorite. To give an example, raw water may be sourced from a river or pond and would need to be brought to a certain specification for use in the process, manufacturing or otherwise.

In at least one embodiment incoming raw water goes through one or more of a string of pretreatment processes, including gravity filters, chemical treatment and other separation processes. Sodium hypochlorite may be added to the incoming raw water and perhaps also at different points during the pretreatment process, to control microbial contaminants. The sodium hypochlorite is added, in its traditional essence, to maintain a certain level of the oxidant as free residual oxidant. The PAA may be added before, during, or after any one, some, or all of the one or more pre-treatment steps. The halogenated oxidant may be added before, during, or after any one, some, or all of the one or more pre-treatment steps.

The invention is superior to prior art methods of neutralizing oxidizing biocides using such materials as reducing agents. For example the prior art use of oxidizing biocides such as hypochlorite are known to cause membrane damage and increased salt passage through the membranes. Thus they require the use of an excess of the reducing agents (often by a factor of up to, equal to, or more than 1.6 times). The large amounts of reducing agents however results in the creation of an anaerobic environment which (as described in U.S. patent application Ser. No. 13/891,908) can cause the profusion of anaerobic organisms, such as SRBs, which produce toxic and membrane damaging sulfuric and sulfurous acids.

Some prior art methods call for using non-oxidizing biocides to kill the organisms and surfactants and/or detergents to remove both the organisms and the biofilms. This however is undesirable as non-oxidizing biocide lack the potency of oxidizing ones. In addition when dealing with already established biofilms, non-oxidizing biocides are often not effective at penetrating the EPS layer and in subsequent killing and/or removal of the microbial populations or derivative products. As a result the invention allows for the use of potent biofilm/EPS penetrating biocides without damaging the membrane.

In at least one embodiment the PAA and/or eq-PAA is added in a single-step process that involves the action of components within a single product. Advantages of this invention include: (a) it is a green chemistry—breakdown products are carbon dioxide and water, (b) it is considered more compatible with membranes than halogenated oxidants, (c) it prevents deterioration of membranes from halogenated oxidants, (d) it may be applied on-line but can also be applied off-line for clean-in-place or other cleaning processes, (e) it will potentially extend the time between membrane cleanings, (f) it is effective at removing both the biological organisms and the EPS that they generate, thus keeping flow channels clear for longer, (g) it neutralizes detrimental halogenated oxidants, and (h) it will improve water quality through transformation of certain ionic species, such as iron and manganese.

Eq-PAA is a commercially available disinfectant product. It may be formed using the equilibrium method of manufacture using hydrogen peroxide, acetic acid, and sulfuric acid. Eq-PAA has been used effectively as a non-halogenated bleaching agent and as a disinfectant. Eq-PAA thus has free peracetic acid, hydrogen peroxide and acetic acid that are thus available to act, or exert an impact, independent of each other upon application.

In at least one embodiment a non-eq-PAA derived PAA is used. PAA can also be produced in alternative ways that do not utilize the use of hydrogen peroxide and/or acetic acid. In such scenario's that do not include hydrogen peroxide and acetic acid in the same product, these chemistries can be supplemented as separate products and the acetic acid may even be substituted with alternate acids or acetyl group donors.

In at least one embodiment the invention also operates to reduce the impact of other biocides also used to treat the water. For example, a source of raw water may be treated with a strong oxidizer such a bleach (sodium hypochlorite) to achieve a bulk coarse biocidal effect greatly reducing the microbial population in the water prior to the PAA treatment. These strong oxidizers may be added before, during, and or after the water is passed through one or more separation methods. These upstream created biocide residuals can have a detrimental impact on the integrity of the components of the membrane separation system. The use of eq-PAA or other peracetic acid compositions would carry with it free hydrogen peroxide, the concentration of which will depend on the concentration of the chosen PAA product and the applied dosage. Hydrogen peroxide is a strong oxidant. Also however, when in contact with a halogenated oxidant, hydrogen peroxide acts as a reducing agent. Thus the addition of eq-PAA will neutralize residual bleach, residual oxidizing biocides, and/or residual halogenated oxidants that have been introduced upstream from the addition of the PAA.

This effect can be understood from the following equation. In an acidic environment the combination of hypochlorous acid (a representative of a halogenated oxidant) and hydrogen peroxide follows the equation:

$$HOCl+H_2O_2 \rightarrow O_2+H^++Cl^-+H_2O$$

This results in the decomposition of both hypochlorous acid (halogenated oxidant) and hydrogen peroxide. It is this feature of the reactions between hydrogen peroxide and the halogenated oxidant that we will take advantage of to kill the detrimental quantities of chlorine with the free hydrogen peroxide in the eq-PAA.

In at least one embodiment the method of biofouling control of the membrane is part of an on-line operation. In this process PAA is utilized for on-line (i.e. during operational conditions) control of microbial fouling in membrane processes. The PAA is an effective biocide and in the case where PAA with free hydrogen peroxide is being utilized, residual hydrogen peroxide carried in the chemistry will provide additional, synergistic biocidal properties to the composition. The use of hydrogen peroxide alone poses issues of potentially developing resistant microbial populations, but the use of PAA in conjunction with peroxide reduces this risk.

In at least one embodiment the method of biofouling control of the membrane uses an in-situ production of an antimicrobial compound for biofouling control in process streams and membrane filtration elements. As previously mentioned, hydrogen peroxide may be used to neutralize residual halogenated oxidant. During this process of neutralization, gas phase molecular oxygen is produced as shown in this reaction:

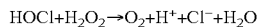

The production of molecular oxygen is of particular significance since molecular oxygen is known to have significant oxidizing potential and an antimicrobial effect. However, molecular oxygen produced is rather unstable and hence storage and delivery as a product is not readily do-able. Prior art methods of molecular oxygen production involve photochemical methods where UV and a molecular oxygen production compound may be utilized or chemically through the interaction of chemical compounds.

In at least one embodiment, the molecular oxygen is produced in-situ of the water treatment process and utilized in an on-line fashion for additive microbial control effect. In at least one embodiment, PAA is the source of the hydrogen peroxide that reacts with the halogenated oxidant to produce the molecular oxygen.

A qualitative analysis of the reaction mechanism shows that the reaction of acid hydrogen peroxide (AHP)+sodium hypochlorite (NaOCl) reaction is virtually identical to the reaction of molecular $H_2O_2$ with molecular HOCl. This reaction mechanism is analogous to that of $Cl_2$+basic hydrogen peroxide (BHP), and HOOCl is the key intermediate in both reactions.

This is quite unexpected because it is known in the art that in a basic medium, it is difficult for the $H_2O_2$ +NaOCl reaction to form the intermediate, HOOCl. Thus, gas-phase $O_2$ cannot be obtained in appreciable quantities (see the scientific paper *Liquid-liquid reaction of hydrogen peroxide and sodium hypochlorite for the production of singlet oxygen in a centrifugal flow singlet oxygen generator*, by Cui, R-R, Deng, L-Z, Shi, W-B, Yang, H-P, Sha, G-H, and Zhang, Quantum Electronics, 41 (2) 139-144) (2011).

The use of eq-PAA provides the conditions where acid hydrogen peroxide (AHP) is made available, at least locally in the system, since there is excess acetic acid present in the eq-PAA composition and free acetic acid is applied simultaneously with the PAA and hydrogen peroxide. In scenarios where eq-PAA is not applied, individual components can be applied separately and the acetic acid could be substituted for other organic or inorganic acids.

In at least one embodiment, the invention facilitates the removal of soluble ionic materials, in particular metal particles. This is accomplished by the conversion of the ionic state of soluble ion species. The presence of ionic species, such as iron and manganese, is a common phenomenon in water systems that undergo treatment through membrane processes. However, the presence of these species poses the issue of significant fouling of membrane surfaces. Iron fouling is very common Like any fouling, it causes a performance loss of the membrane system, specifically flux loss. In addition, the presence of iron makes the membrane more susceptible to oxidation damage. Waters typically contain divalent iron, manganese, or both. If water containing iron or manganese has taken up more than 5 mg/L of oxygen, or has been chlorinated, $Fe^{2+}$ (ferrous) is converted into $Fe^{3+}$ (ferric), which forms insoluble colloidal hydroxide particles that may foul membranes particularly NF and RO membranes.

One prior art approach to avoid membrane fouling is to prevent oxidation and precipitation of ions such as iron and manganese by keeping the water in the reduced state. However, this is not a practical scenario as it interferes with other treatment constraints. In addition, ions such as ferrous iron tend to react with the chlorine neutralizer bisulfite to form insoluble hydrogen sulfide. Moreover such ion (iron)-neutralizer reactions further strips the oxygen from the water resulting in anoxic water.

One prior art method of handling anoxic waters is to oxidize iron and manganese by air, sodium hypochlorite or potassium permanganate ($KMnO_4$). The hydroxides formed can then be removed by media filtration. Hydrogen sulfide will be oxidized to elemental sulfur that can be removed by media filtration as well. Oxidation and filtration can be accomplished in one step by using a filter media with the ability to oxidize divalent iron and manganese by electron transfer. Greensand is such a granular medium, which is a green (when dry) mineral glauconite.

In invention however the PAA creates reaction conditions that greatly ease the problem of anoxic water. In at least one embodiment the oxidative properties of PAA and synergistically the oxidative power of the residual hydrogen peroxide together are utilized to oxidize the nuisance species such that they are precipitated and removed from the system using an appropriate filtration device. This approach would also have the added advantage that the residual oxidant would aid in preventing the development of biofouling in the filter device, thus prolonging its operational life. The oxidizing chemistry would thus be applied upstream of the filtration device and possibly reapplied downstream of the filtration device to gain other advantages as described above.

This can be done both with eq-PAA and PAA. In scenarios where eq-PAA is not applied, individual components can be applied separately and the acetic acid could be substituted for other organic or inorganic acids, or acetyl group donors. Peroxide also oxidizes ferrous to ferric ion. The net reaction of hydrogen peroxide and permanganate or manganese dioxide is manganous ion; however, until the peroxide is spent some manganous ions are reoxidized to make the reaction catalytic.

In at least one embodiment the PAA/eq-PAA is added to a water flow system that is under operation (in on-line mode). In at least one embodiment the determination of whether to or not to add the PAA/eq-PAA is the result of a biological detection mechanism. Representative examples of biological detection mechanism include but are not limited to one or more of the methods, apparatuses, and compositions described in one or more of U.S. patent application Ser. Nos. 14/138,526, 13/657,993, and 13/550,748, and U.S. Pat. Nos. 7,949,432 and 7,981,679, and any combination thereof. In an on-line embodiment, automated feed devices can be controlled by process logic instructing them to introduce PAA/eq-PAA in response to data received from a detection mechanism of a particular measurement of microbiological activity or other surrogate measurement to indicate biological activity or fouling, in one or more locations within a process flow system.

In at least one embodiment the PAA is added in an off-line mode where the membrane system is taken off-line, i.e. removed from normal operation of purification, to facilitate a cleaning process or to meet other operational needs.

In at least one embodiment the biofouling control is applied in conjunction with a clean-in-place (CIP), or other cleaning process, of said membrane filtration elements in an off-line mode. As described for example in U.S. patent application Ser. No. 14/143764, U.S. Pat. Nos. 6,326,340, 6,454,871, 6,027,572, 7,247,210, and 8,398,781, and European Patent Application 0 490 117 A1, clean-in-place cleaning techniques are a specific cleaning regimen adapted for removing soils from the internal components of specific pieces of equipment in a process system. Clean-in-place cleaning involves passing cleaning fluid(s) through the system without dismantling any system components. The minimum clean-in-place technique involves passing the cleaning fluid along or through the equipment and then resuming normal processing. Any product contaminated by cleaner residue may be discarded. Often clean-in-place methods involve an optional first rinse, the application of a cleaning fluid, then an optional second rinse optionally with potable water followed by resumed operations. The process can also include any other contacting step in which a rinse, acidic or basic functional fluid, solvent or other cleaning component such as hot water, cold water, etc. can be contacted with the equipment at any step during the process. In at least one embodiment any one, some, or all of: the first rise, the cleaning fluid, and the second rinse, of the clean-in-place process comprise and/or exclude: oxidizing biocide, PAA, and/or eq-PAA. The CIP process may be applied to the membrane itself and/or to any other price of process equipment upstream or downstream form the membrane.

In at least one embodiment the applied concentration of PAA varies depending on the intended use and the process step that needs to be emphasized. The PAA dose can range from 0.01 ppm (or lower) to 1000 ppm (or higher) and the hydrogen peroxide dose can range from 0.1 ppm (or lower) to 10000 ppm (or higher). In the case of eq-PAA, the dose based on PAA or $H_2O_2$ will define the dose of the second component since they are present as a single solution and their concentrations may vary from one product to the other depending on the vendor. Alternatively, the solutions of PAA and $H_2O_2$ may be added separately.

In at least one embodiment alongside the added PAA/eq-PAA is a scale inhibitor. The scale inhibitor may be added before, after, and/or simultaneously to the PAA/eq-PAA. Representative scale inhibitors include polyphosphates, phosphonates, phosphate esters, other suitable scale inhibitors, and combinations thereof. Representative scale inhibitors include any one, some or all of the compositions, apparatuses, and or methods described in U.S Pat. Nos. 7,169,236, 7,252,096, 7,910,371, 7,875,720, 7,060,136, 5,750,070, 6,315,909.

EXAMPLES

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

Example 1

The efficacy of the POAA based product was examined in terms of killing efficacy and prevention efficacy of biofilm growth on the RO membrane surface in comparison with the commonly used membrane biocide PC-11. Pilot Cooling Tower (PCT) water with average ATP count 3.3E+05 with Tryptic Soy Broth (TSB) nutrient media (30000 ppm) was used for efficacy study. Table 1 shows the % kill efficiency of biocide at different dosages after 3 days of incubation at 30° C. POAA based biocide showed almost similar kill efficient to PC-11 at 2000 ppm dosage while it is more efficient than PC-11 at 100 ppm dosage.

TABLE 1

Biofilm control study at different biocide dosage. (PCT water showed 1.2E+08 count after 3 days of incubation).

| | Biocide | | | | | |
|---|---|---|---|---|---|---|
| | POAA | | | PC-11 | | |
| | Dosage as product (ppm) | | | | | |
| | 2000 | 100 | 2 | 2000 | 100 | 2 |
| ATP assay (ME/ml) | 4.10E+03 | 4.0E+07 | 1.4E+08 | 6.6E+03 | 5.2E+07 | 1.3E+08 |
| % Kill efficiency | 99.9 | 60.4 | — | 99.9 | 37.9 | — |

Example 2

The efficacy of the POAA based product was examined in terms of killing efficacy and prevention efficacy of biofilm growth on the RO membrane surface in comparison with existing biocide PC-11. PCT water with average ATP count 6.6E+05 was used for efficacy study. Table 2 shows the % kill efficiency of biocide at 10 ppm dosage after 3 days of incubation at 30° C. POAA based biocide showed almost similar or slightly better kill efficiency at 10 ppm dosage.

TABLE 2

Biofilm control study at 10 ppm biocide dosage.
(PCT water without TSB showed 3E+06 count after 3 days of incubation).

|  | Biocide | |
| --- | --- | --- |
|  | POAA | PC-11 |
| ATP assay (ME/ml) | 1.7E+06 | 2.1E+06 |
| % Kill efficiency | 43.1 | 30.8 |

Example 3

The efficacy of the POAA based product was examined in terms of killing efficacy and prevention efficacy of biofilm growth on the RO membrane surface as well as planktonic growth. PCT water with average ATP count 8.2E+05 was used for efficacy study. Table 3 shows the % kill efficiency of biocide at 10 ppm dosage at different time interval. POAA based biocide showed similar kill efficiency after 40 min. time interval

TABLE 3

Antibiofilm assay study at 10 ppm POAA biocide dosage.

| Time interval | ATP assay (ME/ml) | | % Kill efficiency | |
| --- | --- | --- | --- | --- |
| (min.) | Antibiofilm | Planktonic | Antibiofilm | Planktonic |
| 10 | 8.9E+03 | 1.5E+06 | 4.3 | 40 |
| 40 | 9.5E+03 | 1.3E+06 | 33.6 | 31.8 |
| 240 | 1.9E+05 | 1.5E+07 | 20.8 | 0 |
| 1440 | 9.3E+06 | 1.3E+09 | 22.5 | 38 |

Example 4

The membrane compatibility of POAA biocide was examined the results of which are shown in FIG. 1. The compatibility study was attempted for 24 hours of continuous running at dosage rate of 50 ppm. It can be seen from FIG. 1 that 50 ppm as a product dosage was not compatible with the RO membrane. At 50 ppm of dosage rate, the permeate flow rate declined about 25% within 24 hours of continuous operation while no change in salt rejection was observed.

Example 5

Figure 2:
FIG. 2 is a graph whose data illustrates the effectiveness of the invention on a membrane at a dosage of 15 ppm.

The membrane compatibility of POAA based biocide was examined and the obtained results are shown in FIG. 2. The compatibility study was attempted for 24 hours of continuous running at dosage rate of 15 ppm. It can be seen from FIG. 2 that at 15 ppm of dosage, the permeate flow rate declined about 13% within 24 hours of continuous operation while no change in salt rejection was observed.

Example 6

Figure 3:
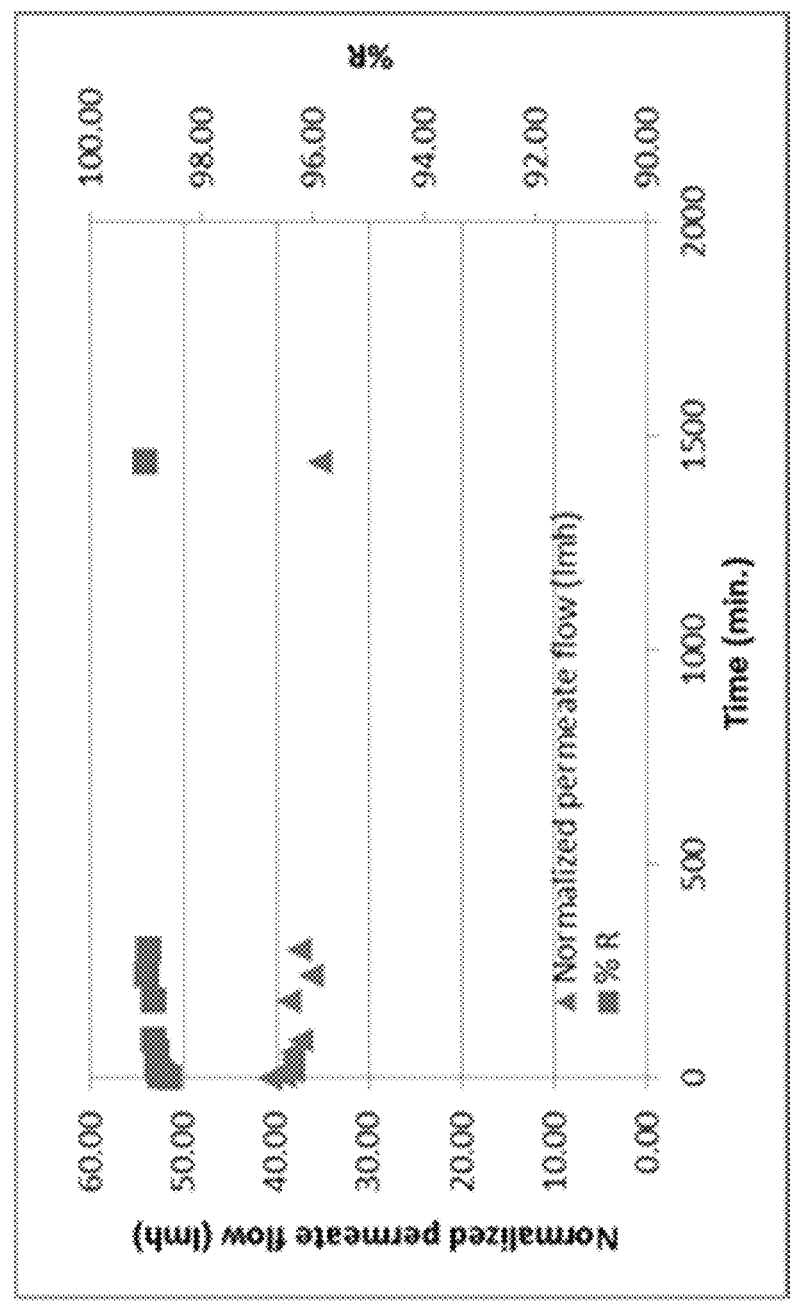
FIG. 3 is a graph whose data illustrates the effectiveness of the invention on a membrane at a dosage of 10 ppm.

The membrane compatibility of POAA based biocide was examined and the obtained results are shown in FIG. 3. The compatibility study was attempted for 24 hours of continuous running at dosage rate of 10 ppm. It can be seen from FIG. 3 that at 10 ppm of dosage, the permeate flow rate declined about 10% within 24 hours of continuous operation while no change in salt rejection was observed.

Example 7

Figure 4:
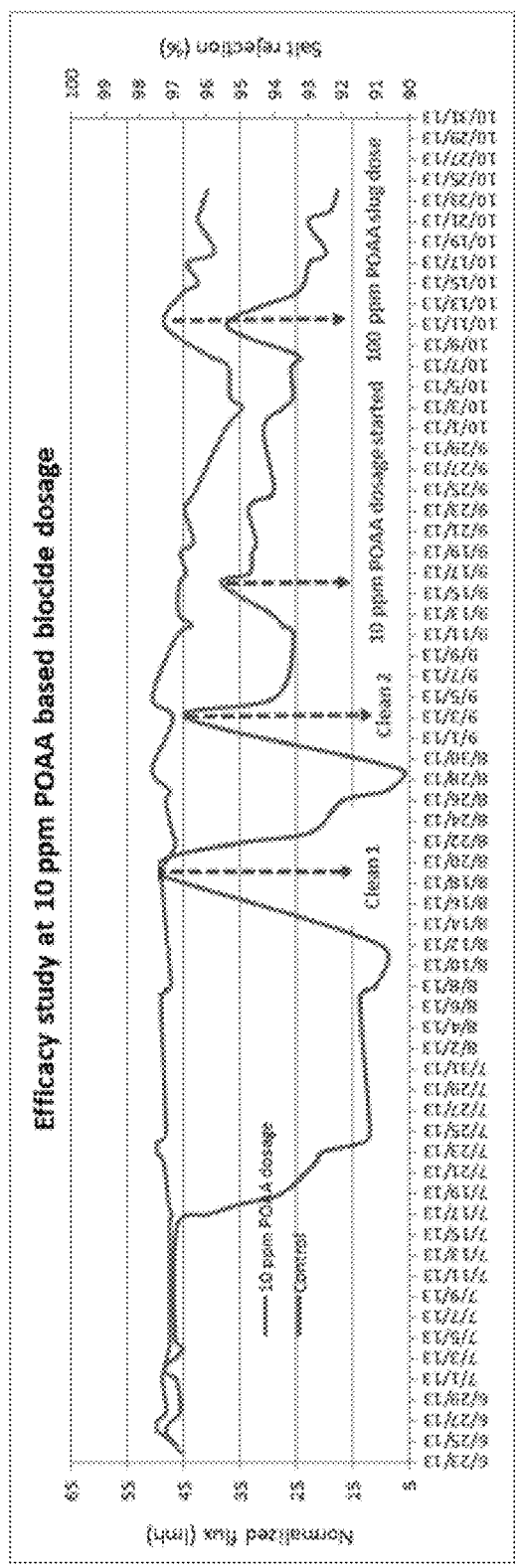
FIG. 4 is a graph whose data illustrates the effectiveness of the invention on a membrane at a dosage of 10 ppm compared to a control without the application of the invention.

The microbio efficacy was studied in cross flow mode at 'Once through' system. Synthetic water was prepared by using tap water in which 1500 ppm Sodium Chloride, 128 ppm Potassium Dihydrogen Phosphate, 45 ppm Sodium Citrate and 2 ml TSB as a nutrient was added. In the same solution, mixed culture bacteria suspension was added to make the synthetic water count $10^4$ CFU/ml. Two cross flow rigs were received the same synthetic water as a feed while one rig acts as control (no dosage of biocide) and other rig with continuous dosage of 10 ppm POAA. It can be seen from FIG. 4 that 10 ppm POAA dosage efficiently controls the biogrowth on the membrane surface while membrane with no dosage showed drop in flux need cleaning two times within the test duration of 4 months.

Example 8

The microbio efficacy was studied in cross flow mode at 'Once through' system. Synthetic water was prepared by using tap water in which 1500 ppm Sodium Chloride, 128 ppm Potassium Dihydrogen Phosphate, 45 ppm Sodium Citrate and 2 ml TSB as a nutrient was added. In the same solution, mixed culture bacteria suspension was added to make the synthetic water count $10^4$ CFU/ml. Two cross flow rigs were received the same synthetic water as a feed while one rig acts as control (no dosage of biocide) and other rig with continuous dosage of 5 ppm POAA. It can be seen from FIG. 5 that 5 ppm POAA dosage efficiently controls the biogrowth on the membrane surface while membrane with no dosage showed drop in flux and need cleaning within the test duration of 1 month.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of preserving the effectiveness of a membrane in a water process flow, comprising:
   adding a composition comprising hydrogen peroxide to the water process flow upstream from the membrane, the water process flow comprising sodium hypochlorite;
   adding peracetic acid or peroxyacetic acid to the water process flow downstream from the addition of the composition and upstream from the membrane in an amount sufficient to inhibit growth of a biofilm on the membrane; and
   contacting the hydrogen peroxide with the sodium hypochlorite before the hydrogen peroxide contacts the membrane,
   wherein the contacting the hydrogen peroxide with the sodium hypochlorite results in conversion of at least some of the hydrogen peroxide into molecular oxygen and water,
   wherein the membrane is a reverse osmosis membrane,
   wherein the amount sufficient to inhibit the growth of the biofilm on the membrane is about 0.1 ppm to about 15 ppm.

2. The method of claim 1, wherein the composition comprises 1-50% by weight of the hydrogen peroxide.

3. The method of claim 1, further comprising the step of removing precipitated ions from the water process flow.

4. The method of claim 1, wherein the molecular oxygen is produced in an amount sufficient to reduce a population of microorganisms in the water process flow.

5. The method of claim 1, wherein the water process flow comprises water that is selected from the group consisting of: river water, sea water, desalinated water, brackish water, well water, aquifer water, pond water, wastewater, recirculated water, sewage water, purified water, de-oxygenated water, and any combination thereof.

6. The method of claim 1, wherein the membrane is in operation.

7. The method of claim 1, wherein the membrane is not in operation.

* * * * *